(12) United States Patent
Choi

(10) Patent No.: US 8,388,217 B2
(45) Date of Patent: Mar. 5, 2013

(54) COOLING STICK FOR A BLENDER AND METHOD OF USING SAME

(76) Inventor: David Choi, Davis, CA (US)

( * ) Notice: Subject to any disclaimer, the term of this patent is extended or adjusted under 35 U.S.C. 154(b) by 0 days.

(21) Appl. No.: 13/429,160

(22) Filed: Mar. 23, 2012

(65) Prior Publication Data

US 2012/0182826 A1      Jul. 19, 2012

Related U.S. Application Data

(62) Division of application No. 12/370,529, filed on Feb. 12, 2009, now Pat. No. 8,172,454.

(51) Int. Cl.
*B01F 15/06* (2006.01)

(52) U.S. Cl. ........................................ 366/147; 366/347

(58) Field of Classification Search ................... 366/144, 366/347; 165/190.1
See application file for complete search history.

(56) References Cited

U.S. PATENT DOCUMENTS

| | | | |
|---|---|---|---|
| 2,468,661 A | 4/1949 | Gladstone | |
| 3,023,587 A | 3/1962 | Robbins | |
| 4,669,275 A | 6/1987 | Ohgushi et al. | |
| 4,843,836 A | 7/1989 | Childers | |
| 4,885,917 A | 12/1989 | Spector | |
| 5,235,823 A | 8/1993 | Coker | |
| 369,502 A | 5/1996 | Albertson | |
| 6,324,864 B1 | 12/2001 | Stewart et al. | |
| 6,338,570 B1 | 1/2002 | Santacruz-Olivares | |
| D458,086 S | 6/2002 | Marks et al. | |
| 6,786,361 B2 | 9/2004 | Moothart et al. | |
| 6,935,767 B2 | 8/2005 | Nikkhah | |
| 6,966,689 B2 | 11/2005 | Daniels, Jr. | |
| 7,028,505 B2 | 4/2006 | Cardinale | |
| D531,445 S | 11/2006 | Bodum | |
| 7,293,427 B1 | 11/2007 | Cushnie | |
| 7,354,192 B2 | 4/2008 | Jejcic | |
| 2006/0171248 A1 | 8/2006 | Chou | |
| 2007/0227369 A1 | 10/2007 | Paumen et al. | |
| 2008/0057168 A1 | 3/2008 | McGill | |
| 2010/0202244 A1 | 8/2010 | Choi | |

*Primary Examiner* — Yogendra Gupta
*Assistant Examiner* — John Robitaille
(74) *Attorney, Agent, or Firm* — David A. Belasco; Belasco Jacobs & Townsley, LLP

(57) ABSTRACT

A cooling stick for a blender includes a cylindrical member designed to fit tightly through a circular aperture extending through the blender lid. The member has a lower portion and an upper portion with a surrounding rim of a diameter larger than the circular aperture. The lower portion has a lower end sized and shaped to avoid contact with the blender blade assembly. The cylindrical member has an interior chamber, an opening extending from an exterior of the member to the chamber and means for sealing the opening. A cooling fluid is located within the interior chamber. The fluid is cooled or frozen when the cooling stick is located in a cooling environment. When the chilled cooling stick is mounted to the lid of the blender, the cooling stick will cool contents of the blender when the blender is operated. The cooling stick also cools the blender contents after operation.

1 Claim, 7 Drawing Sheets

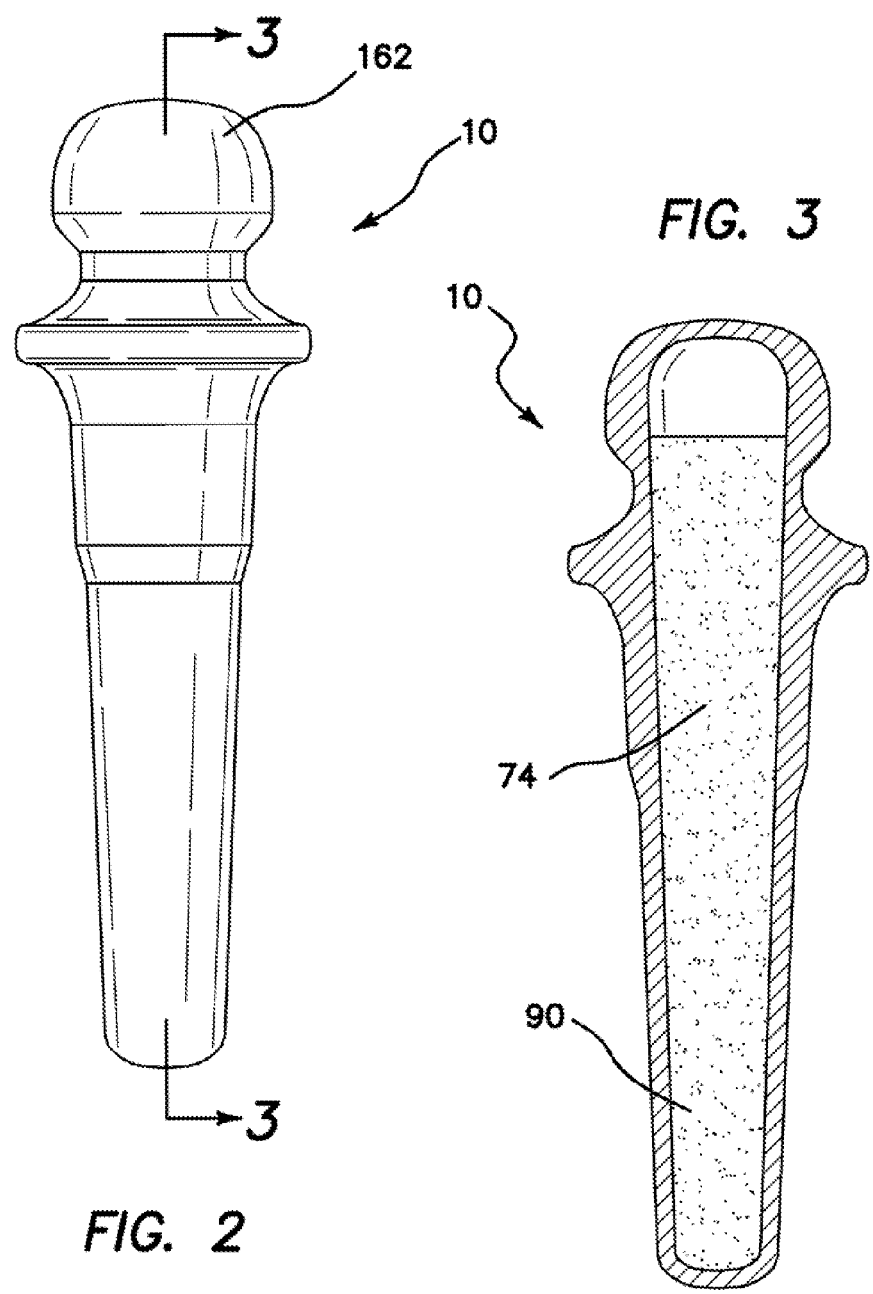

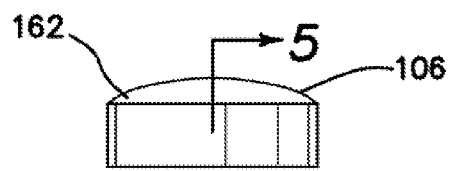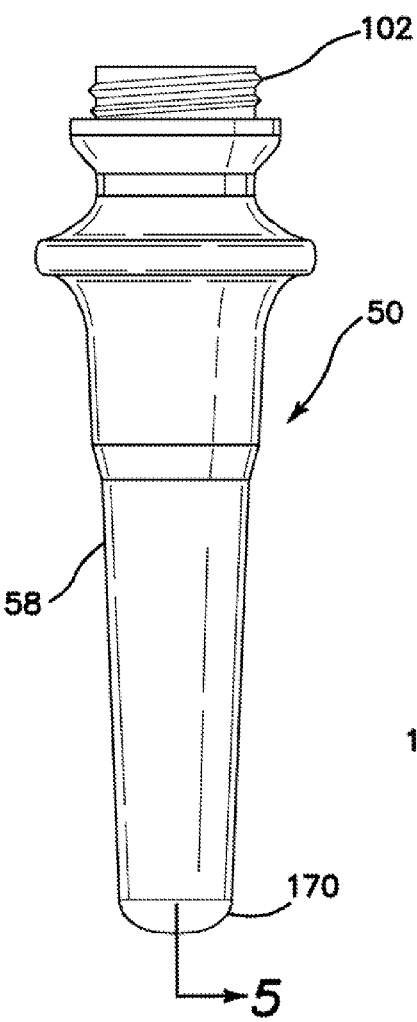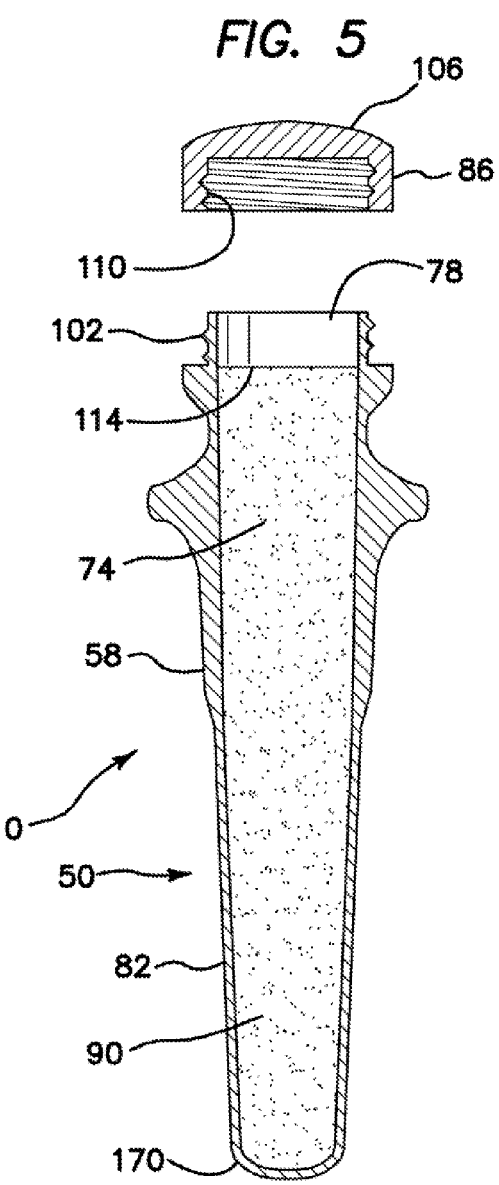

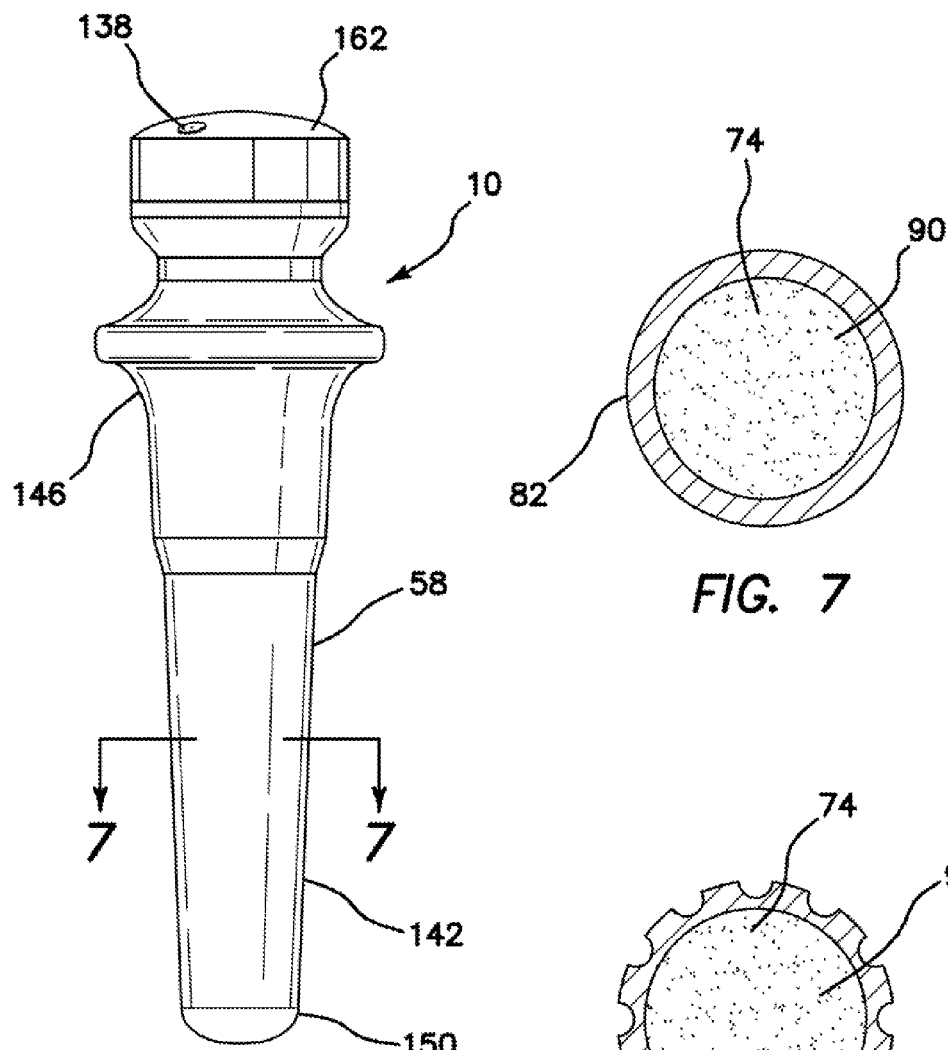
FIG. 6
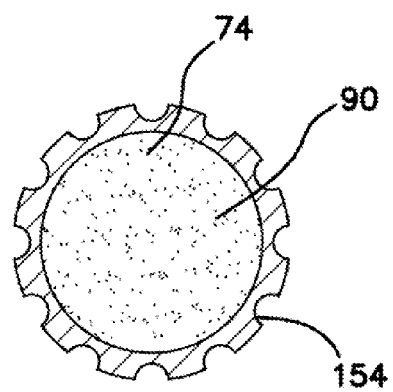
FIG. 7
FIG. 9

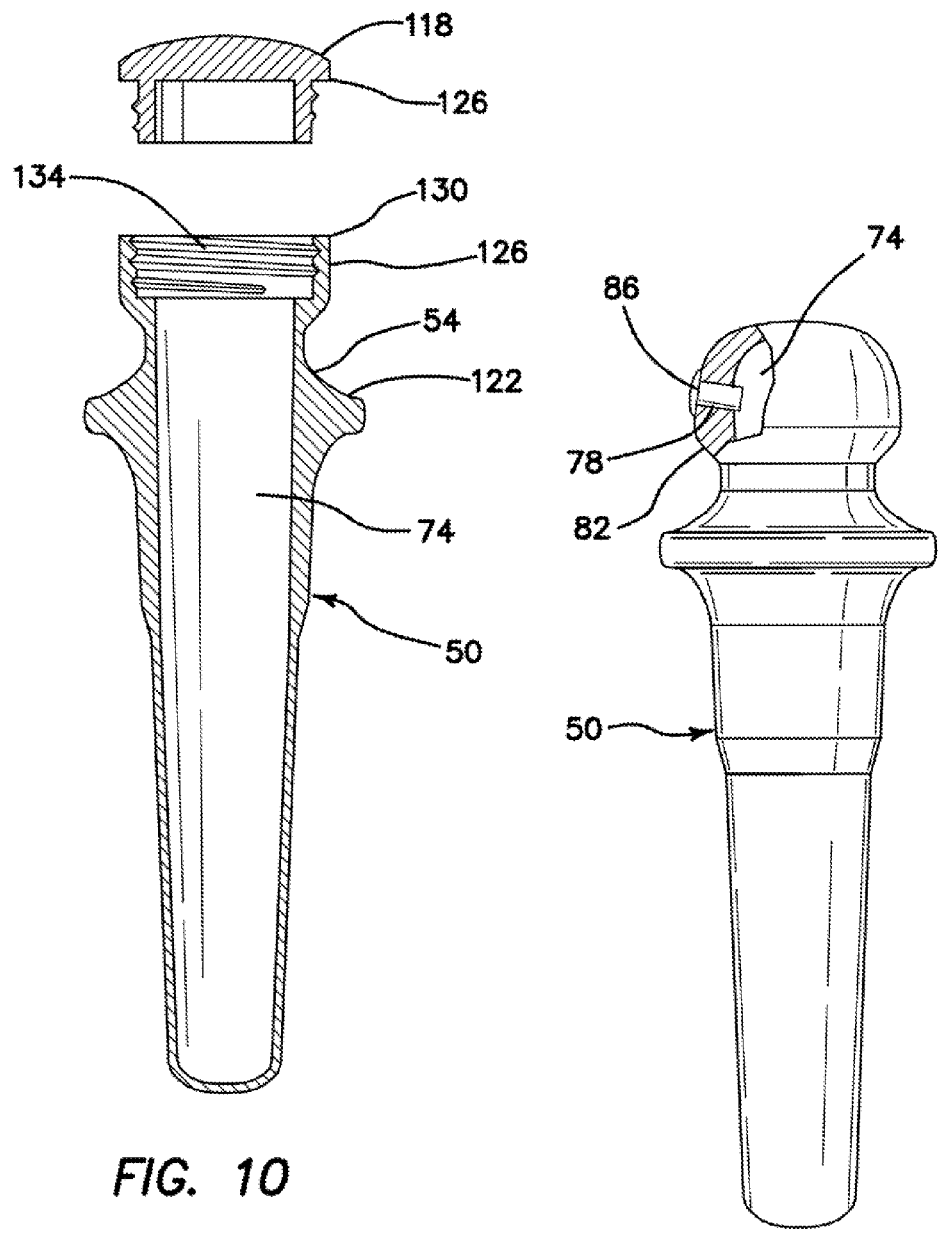

COOLING STICK FOR A BLENDER AND METHOD OF USING SAME

RELATED APPLICATION

The instant application is a divisional application of U.S. application Ser. No. 12/370,529, filed Feb. 12, 2009, now U.S. Pat. No. 8,172,454 and allowed Mar. 16, 2012.

FIELD OF INVENTION

This invention relates to the field of mixing and blending devices, and more specifically to a device and method for cooling the contents of a blender without diluting the contents thereof.

BACKGROUND OF THE INVENTION

Blenders are used to make a variety of food and drink items. It is often desirable to control the temperature of the items to be blended. The mixing action of the blender blades produces friction between the ingredients, the blades and the blender container. The result is raising the temperature of the mixture. This is a particular problem when making cold drinks or soups. In order to cool the ingredients during blending, ice is often added to the mixture. This has several drawbacks. First, it results in the mixture having a "crushed ice" texture or consistency. Second, the blended ice will melt after a short period of time, diluting the mixture. Ideally, the contents of the blender should be cooled during and after blending without diluting the ingredients in the blender container. In this scenario, the contents of the blender can then be stored or refrigerated if not used initially, without damage from dilution due U.S. Patent Application No. 2006/0171248, issued to Chou illustrates a blender that has a freezing preservation function. The blender has a container that is removably connected with the housing. The container has a dual wall with a sealed cavity formed between the inner and outer wall. A freezing medium is filled into the cavity. In use the freezing medium is available for freezing juice and keeping it fresh for a longer time.

U.S. Pat. No. 3,023,587, issued to Robbins describes a chemical cooling stick for beverages. A cooling stick has an outer envelope which contains a crystalline freezing compound and an inner envelope which contains a fluid which cooperates with the crystalline cooling chemical so that when the inner container is broken and the chemicals admix they provide a reduced temperature. The outer envelope is attached to a stirring stick.

U.S. Patent. No. D531,445, issued to Bodum is directed to an ornamental design for a jug that has a small container attached to the underside of the lid and suspended down into the jug. The jug has dual walls apparently for insulation to maintain the hot or cold temperature of the contents. It is apparent that the inner container would be for adding a thermal medium or also providing heating or cooling features.

U.S. Pat. No. 6,786,361, issued to Moothart et al. discloses a beverage cooling and dispensing device that has two separate chambers that are mutually exclusive of each other with the inner chamber adapted to be filled with ice for cooling a beverage that is contained in the outer container. The upper portion is closed off by a common two-in-one combination lid. A tap faucet is provided for controlled release of the beverage.

It is an objective of the present invention to provide a device and method for cooling the ingredients in a blender during and subsequent to blending. It is a further objective to provide such cooling without diluting the contents of the blender. It is a still further objective of the invention to provide a means for sealing the top of the blender both during and subsequent to blending. It is yet a further objective to provide a device that is easily cleaned and sanitized after use. Finally, it is an objective of the present invention to provide a device that is durable, inexpensive and simple to use.

While some of the objectives of the present invention are disclosed in the prior art, none of the inventions found include all of the requirements identified.

SUMMARY OF THE INVENTION

The present invention addresses all of the deficiencies of prior art cooling means for blender inventions and satisfies all of the objectives described above.

(1) A cooling stick for a blender providing the desired features may be constructed from the following components. The blender includes a base housing a vertically oriented drive motor, an open topped vessel adapted to removably mount to the base. A rotating blade assembly is mounted to a lower end of the vessel. The blade assembly is driven by the drive motor. A lid is adapted to seal an upper end of the vessel. The lid has a circular aperture extending through it. The cooling stick includes a cylindrical member. The member has an upper portion and a lower portion. The upper portion has a surrounding rim of a diameter larger than the circular aperture. The lower portion has an upper end sized and shaped to fit frictionally within the circular aperture and a lower end sized and shaped to avoid contact with the blade assembly. The cylindrical member has an interior chamber, an opening extending from an exterior of the member to the chamber and means for sealing the opening. A cooling fluid is provided. The fluid is located within the interior chamber and adapted to be cooled or frozen when the cooling stick is located in a cooling environment. When the cooling stick is located in a cooling environment until chilled, the cooling stick is then mounted to the lid of the blender and the cooling stick will cool contents of the blender.

(2) In a variant of the invention, the interior chamber extends from the lower portion of the cylindrical member to the upper portion, terminating at the opening. The opening has a thread and the opening is removably sealed with a cap that has a mating thread.

(3) In another variant, a fill line is provided. The fill line indicates a suggested limit for the addition of the cooling fluid to the interior chamber.

(4) In still another variant, the upper portion of the cylindrical member has a top end and a bottom end. The top end terminates in a threaded plug. The bottom end includes an upper segment of the interior chamber. The chamber has a proximate end terminating in a mating threaded portion.

(5) In yet another variant, the cooling stick includes an expansion plug. The expansion plug is adapted to relieve pressure within the interior chamber should the chamber be overfilled with cooling fluid and located in a cooling environment sufficiently cold to cause the cooling fluid to freeze.

(6) In a further variant of the invention, the lower portion of the cylindrical member tapers from an upper end toward a lower end, thereby extending depth to which the cylindrical member extends into the vessel.

(7) In still a further variant, the lower portion of the cylindrical member is fluted, thereby increasing surface area contact with contents of the blender.

(8) In yet a further variant, the lower portion of the cylindrical member is tapered and fluted.

(9) In another variant of the invention, the upper portion of the cylindrical member includes a handle for control of the member when inserting the member into the aperture in the lid.

(10) In still another variant, the cooling fluid is permanently sealed within the interior chamber.

(11) In yet another variant, the fluted portions of the cylindrical member are notched, thereby increasing surface area contact with contents of the blender.

(12) In a further variant, a lower end of the lower portion of the cylindrical member is sized and shaped to fit within the blade assembly when mounted to the lid.

(13) In yet a further variant, the cooling fluid is a brine solution.

(14) In still a further variant, the cooling fluid has a coefficient of expansion less than or equal to 4%.

(15) In another variant of the invention, the cooling fluid has a coefficient of expansion ranging from 2% to 6%.

(1) In a final variant of the invention, a method of using a cooling stick in combination with a blender for cooling the contents of a blender vessel is described. The method includes the steps of:
1—providing a blender that includes a base housing a vertically oriented drive motor and an open topped vessel adapted to removably mount to the base. A rotating blade assembly is mounted to a lower end of the vessel. The blade assembly is driven by the drive motor. A lid is adapted to seal an upper end of the vessel. The lid has a circular aperture extending through the lid.
2—providing a cooling stick. The cooling stick includes a cylindrical member. The member has an upper portion and a lower portion. The upper portion has a surrounding rim of a diameter larger than the circular aperture. The lower portion has an upper end sized and shaped to fit frictionally within the circular aperture and a lower end sized and shaped to avoid contact with the blade assembly. The cylindrical member has an interior chamber, an opening extending from an exterior of the member to the chamber and means for sealing the opening.
3—providing a cooling fluid.
4—placing a predetermined quantity of the fluid within the interior chamber.
5—locating the cooling stick in a cooling environment until chilled.
6—filling the blender vessel with contents for blending.
7—introducing the cooling stick into the vessel through the circular aperture.
8—operating the drive motor.

When the cooling fluid is introduced into the cooling stick, the stick is located in a cooling environment until chilled, the cooling stick is then mounted to the lid of the blender, the cooling stick will cool contents of the blender.

An appreciation of the other aims and objectives of the present invention and an understanding of it may be achieved by referring to the accompanying drawings and the detailed description of a preferred embodiment.

DESCRIPTION OF THE DRAWINGS

FIG. 2 is a side elevation of a second embodiment illustrating cooling fluid permanently sealed in the interior chamber;

FIG. 3 is a cross-sectional side elevation of the FIG. 2 embodiment taken along the line 3-3;

FIG. 4 is a side elevation of a third embodiment featuring a screw cap closure for the interior chamber;

FIG. 5 is a cross-sectional side elevation of the FIG. 4 embodiment taken along the line 5-5;

FIG. 6 is a side elevation of a fourth embodiment featuring an expansion plug and tapered lower section;

FIG. 7 is a cross-sectional top view of the FIG. 6 embodiment taken along the line 7-7;

FIG. 9 is a cross-sectional top view of the FIG. 8 embodiment taken along the line 9-9;

FIG. 10 is a cross-sectional side elevation of a sixth embodiment illustrating a screw-threaded plug closure for the interior chamber;

FIG. 11 is a partially cutaway side elevation of the FIG. 1 embodiment illustrating a side plug closure for the interior chamber;

DETAILED DESCRIPTION OF THE PREFERRED EMBODIMENT (1) FIGS. 1-13 illustrate a cooling stick for a blender 10 providing the desired features that may be constructed from the following components. As illustrated in FIG. 1, the blender 14 includes a base 18 housing a vertically oriented drive motor 22, an open topped vessel 26 adapted to removably mount to the base 18. A rotating blade assembly 30 is mounted to a lower end 34 of the vessel 26. The blade assembly 30 is driven by the drive motor 22. A lid 38 is adapted to seal an upper end 42 of the vessel 26. The lid 38 has a circular aperture 46 extending through it. The cooling stick 10 includes a cylindrical member 50. The member 50 has an upper portion 54 and a lower portion 58. The upper portion 54 has a surrounding rim 62 of a diameter larger than the circular aperture 46. The lower portion 58 has an upper end 66 sized and shaped to fit frictionally within the circular aperture 46 and a lower end 70 sized and shaped to avoid contact with the blade assembly 30. As illustrated in FIGS. 5, 8 and 9, the cylindrical member 50 has an interior chamber 74, an opening 78 extending from an exterior 82 of the member 50 to the chamber 74 and means 86 for sealing the opening 78. A cooling fluid 90 is provided. The fluid 90 is located within the interior chamber 74 and adapted to be cooled or frozen when the cooling stick 10 is located in a cooling environment (not shown). When the cooling stick 10 is located in a cooling environment until chilled, the cooling stick 10 is then mounted to the lid 38 of the blender 14 and the cooling stick 10 will cool contents (not shown) of the blender 14.

Figure 1:
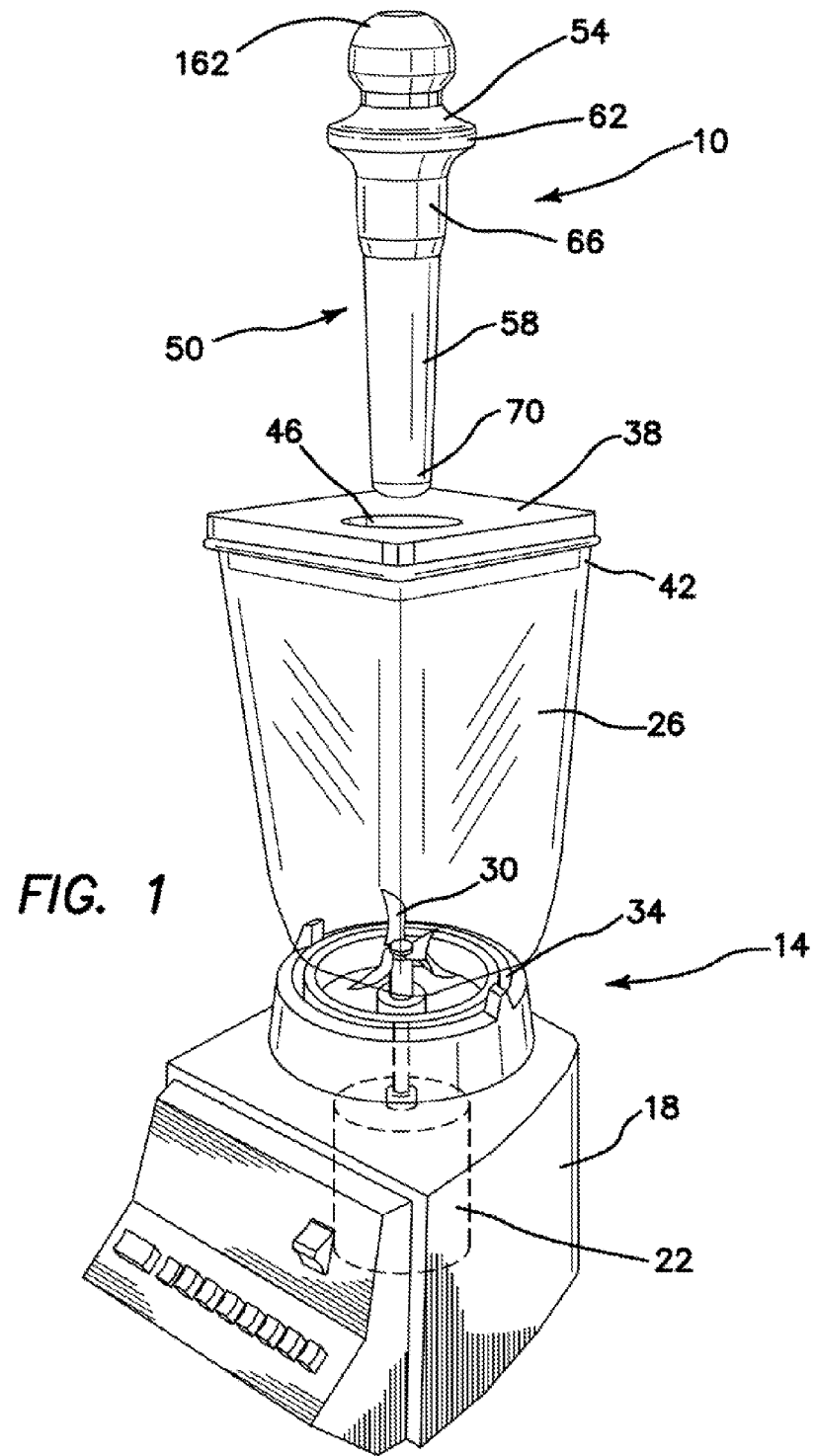
FIG. 1 is a perspective view of the preferred embodiment of the invention shown in conjunction with a typical blender.

(2) In a variant of the invention, as illustrated in FIGS. 4 and 5, the interior chamber 74 extends from the lower portion 58 of the cylindrical member 50 to the upper portion 54, terminating at the opening 78. The opening 78 has a thread 102 and the opening 78 is removably sealed with a cap 106 that has a mating thread 110.

(3) In another variant, a fill line 114 is provided. The fill line 114 indicates a suggested limit for the addition of the cooling fluid 90 to the interior chamber 74.

(4) In still another variant, as illustrated in FIG. 10, the upper portion 54 of the cylindrical member 50 has a top end 118 and a bottom end 122. The top end 118 terminates in a threaded plug 126. The bottom end 122 includes an upper segment 126 of the interior chamber 74. The chamber 74 has a proximate end 130 terminating in a mating threaded portion 134.

(5) In yet another variant, as illustrated in FIG. 6, the cooling stick 10 includes an expansion plug 138. The expansion plug 138 is adapted to relieve pressure within the interior chamber 74 should the chamber 74 be overfilled with cooling fluid 90 and located in a cooling environment 94 sufficiently cold to cause the cooling fluid 90 to freeze.

(6) In a further variant of the invention, the lower portion 58 of the cylindrical member 50 is tapered 142 from an upper end 146 toward a lower end 150, thereby extending depth to which the cylindrical member 50 extends into the vessel 26.

Figure 8:
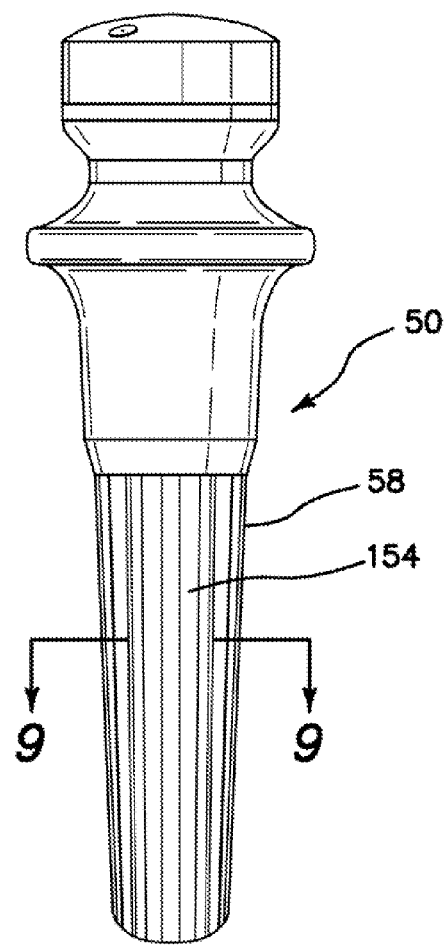
FIG. 8 is side elevation of a fifth embodiment illustrating a tapered and fluted lower section.
Figure 9A:
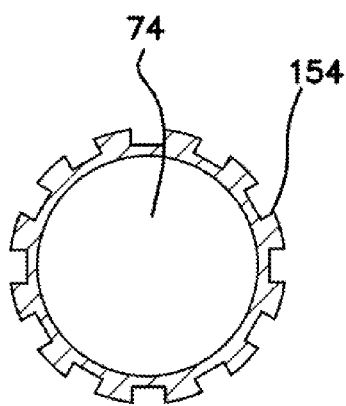
FIG. 9A is a cross-sectional top view of a variant of the FIG. 8 embodiment featuring square-sided fluting.

(7) In still a further variant, as illustrated in FIGS. 8, 9 and 9A, the lower portion 58 of the cylindrical member 50 is fluted 154, thereby increasing surface area contact with contents 158 of the blender 14.

(8) In yet a further variant, the lower portion 58 of the cylindrical member 50 is tapered 142 and fluted 154.

(9) In another variant of the invention, as illustrated in FIGS. 1, 2, 4 and 6, the upper portion 54 of the cylindrical member 50 includes a handle 162 for control of the member 50 when inserting the member 50 into the aperture 46 in the lid 38.

(10) In still another variant, as illustrated in FIGS. 2 and 3, the cooling fluid 90 is permanently sealed within the interior chamber 74.

Figures 12, 13:
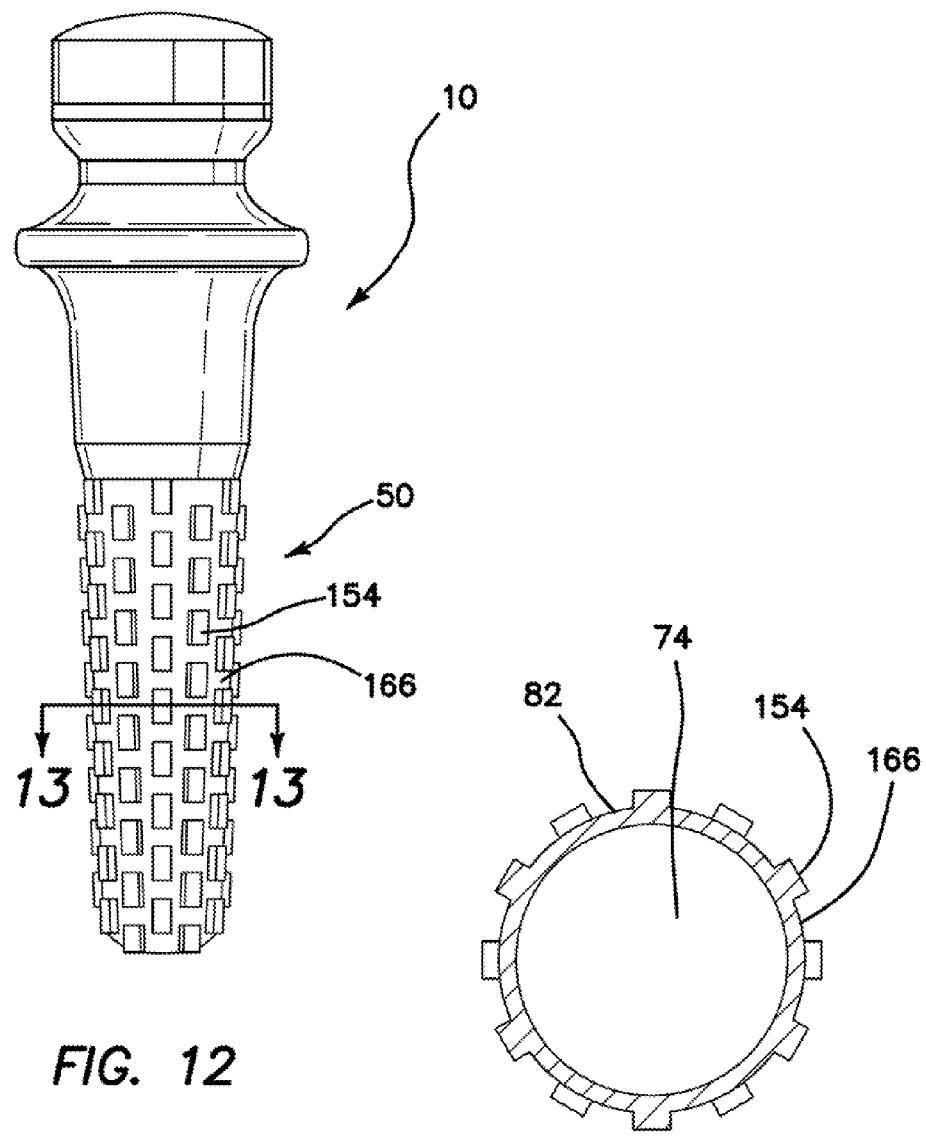
FIG. 12 is side elevation of a seventh embodiment illustrating a tapered, fluted and notched lower section.
FIG. 13 is a cross-sectional top view of the FIG. 12 embodiment taken along the line 13-13.

(11) In yet another variant, as illustrated in FIGS. 12 and 13, the fluted portions 154 of the cylindrical member 50 are notched 166, thereby increasing surface area contact with contents of the blender 14.

(12) In a further variant, as illustrated in FIGS. 4 and 5, a lower end 170 of the lower portion 58 of the cylindrical member 50 is sized and shaped to fit within the blade assembly 30 when mounted to the lid 38.

(13) In yet a further variant, the cooling fluid 90 is a brine solution.

(14) In still a further variant, the cooling fluid 90 has a coefficient of expansion less than or equal to 4%.

(15) In another variant of the invention, the cooling fluid 90 has a coefficient of expansion ranging from 2% to 6%.

(1) In a final variant of the invention, as illustrated in FIGS. 1 and 5, a method using a cooling stick 10 in combination with a blender 14 for cooling the contents of a blender vessel 26 is described. The method includes the steps of:
1—providing a blender 14 that includes a base 18 housing a vertically oriented drive motor 22 and an open topped vessel 26 adapted to removably mount to the base 18. A rotating blade assembly 30 is mounted to a lower end 34 of the vessel 26. The blade assembly 30 is driven by the drive motor 22. A lid 38 is adapted to seal an upper end 42 of the vessel 26. The lid 38 has a circular aperture 46 extending through the lid 38.
2—providing a cooling stick 10. The cooling stick 10 includes a cylindrical member 50. The member 50 has an upper portion 54 and a lower portion 58. The upper portion 54 has a surrounding rim 62 of a diameter larger than the circular aperture 46. The lower portion 58 has an upper end 66 sized and shaped to fit frictionally within the circular aperture 46 and a lower end 70 sized and shaped to avoid contact with the blade assembly 30. The cylindrical member 50 has an interior chamber 74, an opening 78 extending from an exterior 82 of the member 50 to the chamber 74 and means 86 for sealing the opening 78.
3—providing a cooling fluid 90.
4—placing a predetermined quantity of the fluid 90 within the interior chamber 74.
5—locating the cooling stick 10 in a cooling environment 94 until chilled.
6—filling the blender vessel 26 with contents 158 for blending.
7—introducing the cooling stick 10 into the vessel 26 through the circular aperture 46.
8—operating the drive motor 22.

When the cooling fluid 90 is introduced into the cooling stick 10, the stick 10 is located in a cooling environment 94 until chilled, the cooling stick 10 is then mounted to the lid 38 of the blender 14, the drive motor 22 of the blender 14 is operated, the cooling stick 10 will cool contents of the blender 14.

The cooling stick for a blender 10 and the method of using the stick to cool the contents of a blender vessel have been described with reference to particular embodiments. Other modifications and enhancements can be made without departing from the spirit and scope of the claims that follow.

The invention claimed is:

1. A method of using a cooling stick in combination with a blender for cooling the contents a blender vessel, comprising the steps of:
providing a blender comprising a base housing a vertically oriented drive motor, an open topped vessel adapted to removably mount to said base, a rotating blade assembly mounted to a lower end of said vessel, said blade assembly driven by said drive motor, a lid adapted to seal an upper end of said vessel, said lid having a circular aperture extending through said lid;
providing a cooling stick comprising:
a cylindrical member, said member having an upper portion and a lower portion;
said upper portion having a surrounding rim of a diameter larger than said circular aperture;
said lower portion having an upper end sized and shaped to fit frictionally within said circular aperture and a lower end sized and shaped to avoid contact with said blade assembly;
said cylindrical member having an interior chamber, an opening extending from an exterior of said member to said chamber and means for sealing said opening;
providing a cooling fluid;
placing a predetermined quantity of said fluid within said interior chamber;
disposing said cooling stick in a cooling environment;
filling said blender vessel with contents for blending;
introducing said cooling stick into said vessel through said circular aperture; and
operating said drive motor.
whereby, when said cooling fluid is introduced into said cooling stick, said stick is disposed in a cooling environment, said cooling stick is then mounted to said lid of said blender, said drive motor of said blender is operated, said cooling stick will cool contents of said blender.

* * * * *